(12) United States Patent
Lee et al.

(10) Patent No.: US 11,146,159 B2
(45) Date of Patent: Oct. 12, 2021

(54) BRUSHLESS MOTOR

(71) Applicant: TTI (MACAO COMMERCIAL OFFSHORE) LIMITED, Macau (MO)

(72) Inventors: Hei Man Raymond Lee, Kwai Chung (CN); Nan Wang, Dongguan (CN); Zheng Li, Dongguan (CN); Li Feng Wang, Dongguan (CN)

(73) Assignee: TTI (Macao Commercial Offshore) Limited, Praia Grande (MO)

( * ) Notice: Subject to any disclaimer, the term of this patent is extended or adjusted under 35 U.S.C. 154(b) by 0 days.

(21) Appl. No.: 16/339,333

(22) PCT Filed: Mar. 21, 2017

(86) PCT No.: PCT/CN2017/077465
§ 371 (c)(1),
(2) Date: Apr. 3, 2019

(87) PCT Pub. No.: WO2018/170726
PCT Pub. Date: Sep. 27, 2018

(65) Prior Publication Data
US 2019/0245422 A1    Aug. 8, 2019

(51) Int. Cl.
| | |
|---|---|
| *H02K 1/27* | (2006.01) |
| *H02K 21/20* | (2006.01) |
| *H02K 7/08* | (2006.01) |
| *H02K 7/04* | (2006.01) |

(52) U.S. Cl.
CPC ............... *H02K 21/20* (2013.01); *H02K 7/04* (2013.01); *H02K 7/085* (2013.01)

(58) Field of Classification Search
CPC .......... H02K 21/22; H02K 21/14; H02K 1/27; H02K 1/2706; H02K 5/1735
See application file for complete search history.

(56) References Cited

U.S. PATENT DOCUMENTS

| | | | | |
|---|---|---|---|---|
| 3,886,256 | A | * 5/1975 | Ohuchi | ..................... H02K 1/16 310/216.069 |
| 4,009,406 | A | * 2/1977 | Inariba | ................. H02K 21/145 310/164 |
| 4,700,098 | A | * 10/1987 | Kawashima | ........... H02K 29/08 310/156.45 |

(Continued)

FOREIGN PATENT DOCUMENTS

| | | |
|---|---|---|
| CN | 101626183 | 1/2010 |
| CN | 202957679 | 5/2013 |

(Continued)

OTHER PUBLICATIONS

International Search Report and Written Opinion for Application No. PCT/CN2017/077465 dated Aug. 29, 2017 (7 pages).

(Continued)

*Primary Examiner* — Dang D Le
(74) *Attorney, Agent, or Firm* — Michael Best & Friedrich LLP

(57) ABSTRACT

A brushless motor includes a stator (26) having six slots (30), and a rotor having two poles. The rotor is adapted to rotate with respect to the stator. By adopting a 6-slots-2-poles structure, the brushless motor effectively reduces operational noise due to iron loss and unbalanced pull. As a result, the working life of the motor can be improved.

10 Claims, 2 Drawing Sheets

(56) References Cited

U.S. PATENT DOCUMENTS

| | | | | |
|---|---|---|---|---|
| 5,039,897 | A * | 8/1991 | Iwamatsu | H02K 1/2773 310/156.18 |
| 5,045,738 | A * | 9/1991 | Hishida | F16C 19/54 310/67 R |
| 5,331,245 | A * | 7/1994 | Burgbacher | H02K 29/03 310/186 |
| 5,924,855 | A * | 7/1999 | Dahmlos | F01C 21/02 418/201.1 |
| 6,050,729 | A * | 4/2000 | Obara | F16C 19/18 384/544 |
| 6,858,961 | B2 * | 2/2005 | Tagome | B60L 50/16 310/156.56 |
| 6,952,064 | B2 * | 10/2005 | Hiwaki | H02K 1/146 310/214 |
| 6,956,311 | B2 * | 10/2005 | Hosaka | H02K 1/2753 310/156.38 |
| 7,071,592 | B1 * | 7/2006 | Lu | H02K 1/278 310/156.25 |
| 7,573,165 | B2 * | 8/2009 | Cook | F04C 18/16 310/90 |
| 7,728,481 | B2 * | 6/2010 | Lee | H02K 1/165 310/216.041 |
| 8,403,653 | B2 * | 3/2013 | Yamamoto | H02K 9/06 417/423.7 |
| 8,569,924 | B2 * | 10/2013 | Yasuda | H02K 1/185 310/216.069 |
| 2013/0307455 | A1 * | 11/2013 | Akatsu | H02K 3/20 318/441 |
| 2018/0240581 | A1 * | 8/2018 | Saito | H01F 41/0266 |

FOREIGN PATENT DOCUMENTS

| | | |
|---|---|---|
| CN | 206004436 | 3/2017 |
| DE | 10259426 | 6/2004 |
| DE | 102008006399 | 8/2008 |
| DE | 202014103629 U1 | 9/2014 |
| JP | H1023704 | 1/1998 |
| JP | 2014192951 A | 10/2014 |

OTHER PUBLICATIONS

Extended European Search Report for Application No. 17902129.0 dated Oct. 16, 2020 (8 pages).

* cited by examiner

BRUSHLESS MOTOR

FIELD OF INVENTION

This invention relates to electric motors, and in particular to the stator and rotor structure of brushless motors.

BACKGROUND OF INVENTION

Brushless motors have been widely used in electric appliances such as power tools since brushless motors provide a higher torque, reduce the noise and provide a longer lifetime as compared to brushed motors. Brushless motors are particularly useful for applications where high output speed is required.

However, traditional brushless motors suffer from certain disadvantages. When the rotational speed is high, the brushless motors tend to produce a sharp electromagnetic noise, which would severely affect the user experience. In addition, the rotor in traditional brushless motors creates a large unbalanced magnetic force which not only affects the dynamic balance of the rotor, but also reduces the working life of the bearing.

SUMMARY OF INVENTION

In the light of the foregoing background, it is an object of the present invention to provide an alternate brushless motor which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a brushless motor including a stator having six slots, and a rotor having two poles. The rotor is adapted to rotate with respect to the stator.

Preferably, the stator includes three sets of windings, each of which wounded on two of six teeth of the stator in a sequential manner.

More preferably, the three sets of windings are connected at their tail ends using wye connection.

According to one variation of the preferred embodiments, the rotor comprises two semicircular-shaped magnets.

According to another aspect of the present invention, there is provided a brushless motor, which contains a stator, and a rotor adapted to rotate with respect to the stator. The rotor contains a motor shaft which defines an axis of rotation of the rotor. The rotor is supported by a single bearing device which is closer to one end of the motor shaft than to the other end along a longitudinal direction of the motor shaft.

Preferably, the bearing device contains one or more bearings which are made integrally with the motor shaft as a single piece.

More preferably, the bearing device contains two bearings.

According to one variation of the preferred embodiments, adjacent to the other end of the motor shaft there are arranged magnets on the motor shaft.

In one specific implementation there are two or more magnets arranged along the longitudinal direction which are separated by an isolating ring.

In another specific implementation the magnet is adhered to the motor shaft.

According to another variation of the preferred embodiments, adjacent to the other end of the motor shaft there is arranged a balancing ring on the motor shaft.

Preferably, the balancing ring is adhered to the motor shaft.

There are many advantages to the present invention. By adopting a 6-slots-2-poles structure, the brushless motor according to the present invention effectively reduces operational noise caused by iron loss and unbalanced pull. As a result, hours of use of the tool can be extended and also the working life of the motor can be improved. The present invention is particularly useful for motors having a rotational speed larger than 10,000 rpm, and especially when the rotational speed rises to 100,000 rpm. On the other hand, the rotor including two semicircular magnets has a relatively small external radius, which reduces its rotational momentum and increase the rotational speed. The large slot size of the stator increases the dimensions of air channels, and thus facilitates heat dissipation.

Another advantage of the present invention is that the stator uses concentrated windings which are simple for assembling process. As the windings have a relatively small thickness, the amount of cooper wire required for making the windings can be significantly reduced, and the production difficulties are also reduced. In addition, the concentrated windings cause the armature magnetic field producing a substantially sinusoidal pattern, which effectively eliminates the harmonic components which produce the electromagnetic noises, and thus improves the user experience.

Moreover, the present invention includes the embodiment of a cantilever structure of the rotor. As the bearing(s) are only located on one end of the shaft, it prevents accumulative tolerances produced between the shaft, the bearings and the bearing chamber due to wobbling of shaft and differences in dimensions in the case of bearings located on both sides of the shaft. In addition, as the inner ring of the bearing is made as a single piece with the shaft, there is no mismatch error incurred when the bearing inner ring is press-fitted onto the shaft and the shaft pressed against the balls in the bearing. Therefore, the bearing is capable of rotating in a nearly ideal case, and the motor has a structure which minimizes the vibrations and noises during high-speed rotation.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
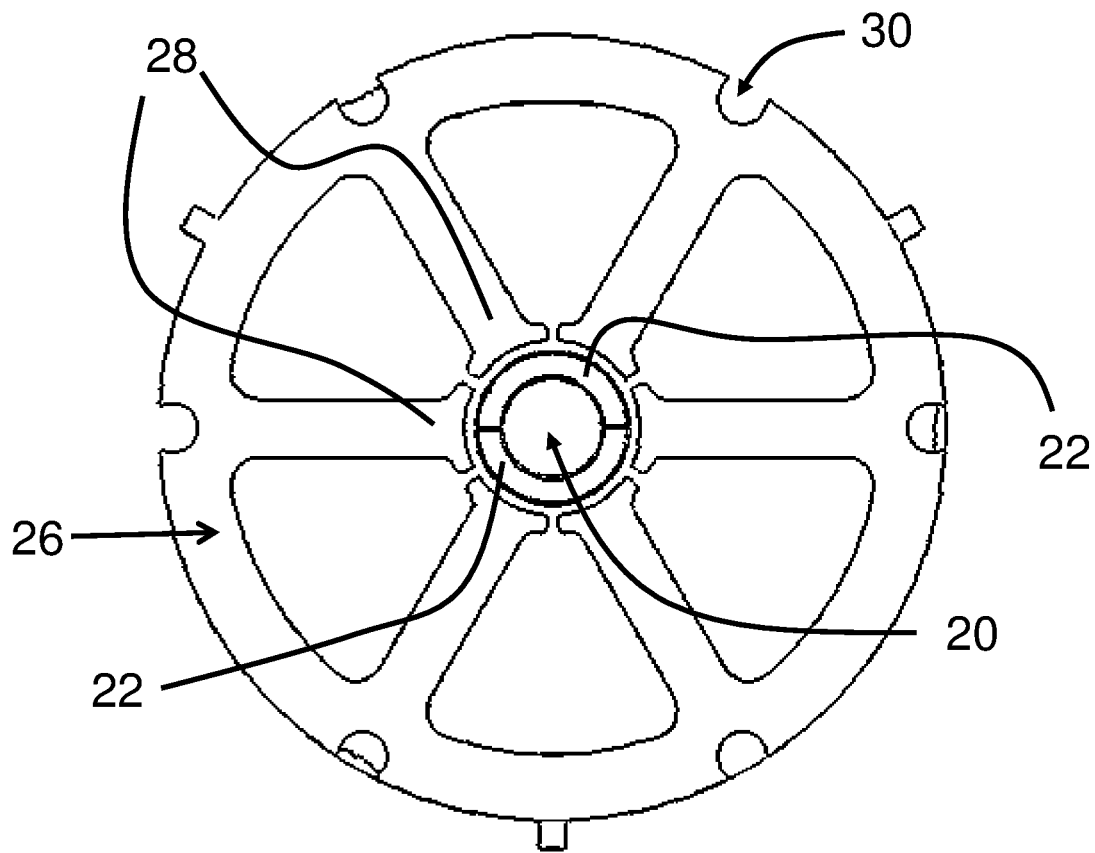
FIG. 1 is an illustration of the stator and rotor structure of the brushless motor in a cross-sectional view, according to a first embodiment of the present invention.

Referring now to FIG. 1, the first embodiment of the present invention is a brushless motor which includes a stator 26 and a rotor. The rotor is placed at the center of the motor and is adapted to rotate relative to the stator 26. The rotor includes a motor shaft 20 and a plurality of magnets 22 configured on the shaft 20. In particular, there are two semicircular magnets 22 configured on the shaft 20. On the stator 26, there are six slots 30 formed equidistantly around the perimeter of the stator 26. Corresponding to the angular positions of these slots 30 there are also six teeth 28 formed at the interior of the stator 26. There are windings (not shown in FIG. 1) wounded on each of these teeth 28 in concentrated manner.

Figure 2:
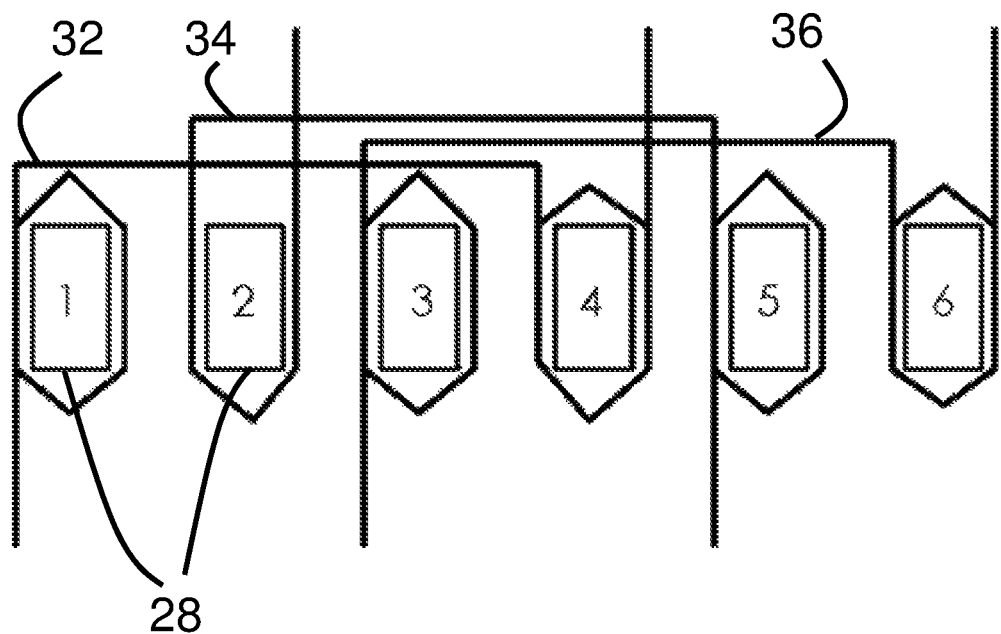
FIG. 2 shows the wiring diagram of the stator windings of the brushless motor in FIG. 1.

FIG. 2 best illustrates the concentrated winding in the present invention. On each of the teeth 28, there is only a single set of winging out of three sets of windings for the three-phase brushless motor. For example, look along the circumferential direction and choose any one of the teeth as a starting point, then the $1^{st}$ and $4^{th}$ teeth 28 have the first set of windings 32 mounted thereon. The $2^{nd}$ and $5^{th}$ teeth 28 have the second set of windings 34 mounted thereon. The $3^{rd}$ and $6^{th}$ teeth 28 have the second set of windings 36 mounted thereon. In other words, on each of the teeth 28 there is no overlapping of two or more sets of windings.

Figure 3:
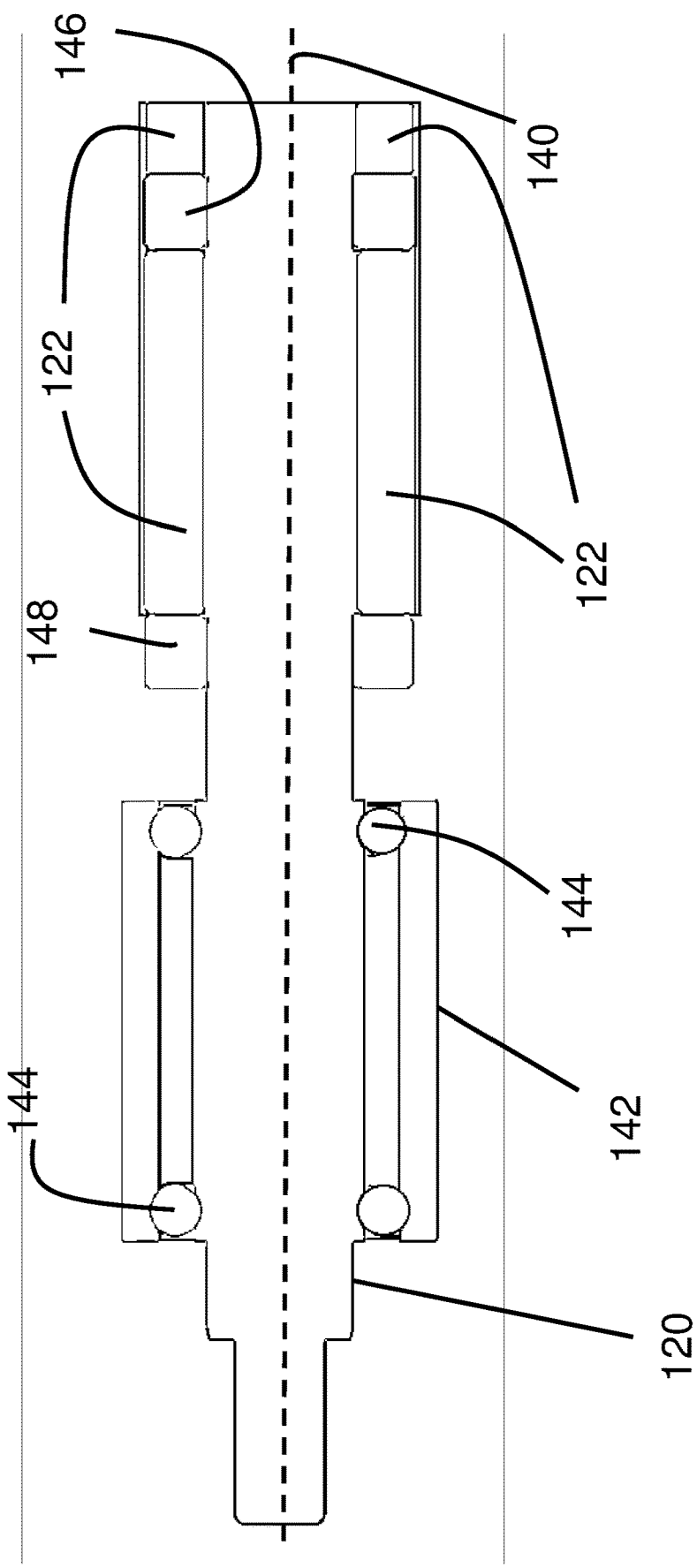
FIG. 3 shows a cross-sectional view of the rotor of a brushless motor according to a second embodiment of the present invention.

Referring now to FIG. 3, according to another embodiment of the present invention, a rotor of a brushless motor has a longitudinal direction defined by its axis 140 of rotation. The rotor includes a shaft 120 and a bearing device 142 located adjacent to one end of the shaft 120. The bearing device 142 further contains two bearings 144 separated from each other along the longitudinal direction within the bearing device 142. Note that the entire bearing device 142 is closer to one end of the shaft 120 (the left end as shown in FIG. 3) compared to the other end of the shaft 120 (the right end as shown in FIG. 3). It follows that each of the two bearings 144, no matter how far they are separated from each other, is also closer to one end of the shaft 120 compared to the other end of the shaft 120. The inner rings (not shown) of the two bearings 144 are manufactured integrally with the shaft 120, for example by using machining.

On the other end of the shaft 120 (the right end as shown in FIG. 3), magnets 122 are mounted on the shaft 120. In other words, the magnets 122 and the bearing device 142 are arranged substantially on two opposite ends of the shaft 120. Note that there are two or more magnets 122 arranged along the longitudinal direction and they are separated by an isolation ring 146. In addition, a balancing ring 148 is mounted on the shaft 120 approximately between the magnets 122 and the bearing device 142. Preferably, the balancing ring 148 is pressed against the end of magnet(s) 122 which directly faces the bearing device 142.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

What is claimed is:

1. A brushless motor, comprising:
   a) a stator having six slots formed equidistantly around a perimeter of the stator, the six slots corresponding to respective angular positions of six teeth formed at an interior of the stator;
   b) a rotor comprising a motor shaft which defines an axis of rotation of the rotor, the rotor having two poles;
   wherein the rotor is adapted to rotate with respect to the stator;
   wherein the rotor is supported by a single bearing device which is closer to one end of the motor shaft than to the other end along a longitudinal direction of the motor shaft;
   wherein adjacent to said other end of the motor shaft there are arranged magnets on the motor shaft;
   wherein there are two or more said magnets arranged along the longitudinal direction which are separated by an isolating ring; and
   wherein a balancing ring is mounted on the motor shaft between the magnets and the bearing device.

2. The brushless motor of claim 1, wherein the stator further comprises three sets of windings, each of which wounded on two of six teeth of the stator in a sequential manner.

3. The brushless motor of claim 2, wherein the three sets of windings are connected at their tail ends using wye connection.

4. The brushless motor of claim 1, wherein the magnets comprise two semicircular-shaped magnets.

5. The brushless motor of claim 1, wherein the bearing device comprises one or more bearings which are made integrally with the motor shaft as a single piece.

6. The brushless motor of claim 5, wherein the bearing device comprises two bearings.

7. The brushless motor of claim 1, wherein the magnets are adhered to the motor shaft.

8. The brushless motor of claim 1, wherein the balancing ring is adhered to the motor shaft.

9. The brushless motor of claim 1, wherein the bearing device comprises a bearing having an inner ring formed integrally with the motor shaft as a single piece.

10. A brushless motor, comprising:
- a stator;
- a rotor adapted to rotate with respect to the stator; the rotor comprising a motor shaft which defines an axis of rotation of the rotor;
- wherein the rotor is supported by a single bearing device which is closer to one end of the motor shaft than to the other end along a longitudinal direction of the motor shaft;
- wherein adjacent to said other end of the motor shaft there are arranged magnets on the motor shaft;
- wherein there are two or more said magnets arranged along the longitudinal direction which are separated by an isolating ring; and
- wherein a balancing ring is mounted on the shaft between the magnets and the bearing device.

\* \* \* \* \*